United States Patent Office 3,579,286
Patented May 18, 1971

3,579,286
POLYALKYLENE POLYAMINE THIOSULFONATED SULFUR DYE COMPOSITION AND DYEING THEREWITH
Christian Heid, Frankfurt am Main-Fechenheim, Willi Gunzert, Frankfurt am Main, and Fritz Engelhardt, Frankfurt am Main-Fechenheim, Germany, assignors to Cassella Farbwerke Mainkur Aktiengesellschaft Frankfurt am Main-Fechenheim, Germany
No Drawing. Filed Aug. 23, 1968, Ser. No. 753,998
Claims priority, application Germany, Aug. 27, 1967,
P 16 19 404.0
Int. Cl. D06p *1/30*
U.S. Cl. 8—37                                        9 Claims

ABSTRACT OF THE DISCLOSURE

Thiosulfonate forms of sulfur dyes are fixed on cellulosic fibers by merely drying the fibers after they have been impregnated with the dye and with a polyalkylene polyamide having at least three primary or secondary amine groups and in which the alkylene groups have two to four carbons.

---

Thiosulfonate forms of sulfur dyes have been developed as water-soluble dyeing materials and are particularly desirable for this reason. Unfortunately they are also difficult to fix on fibers, and many prior suggestions have been made for improving the fixing. The use of alkaline reducing agents such as alkali metal sulfides or hydrosulfides gives good results but has odor problems that unduly complicate the dyeing. High temperature fixing of such dyes with amino compounds is the subject of U.S. Pat. 3,387,913 granted June 11, 1968, and of prior U.S. patent application Ser. No. 747,478, filed July 25, 1968, now abandoned.

According to the present invention cellulosic fibers such as cotton and regenerated cellulose (rayon) have the foregoing soluble dyes very effectively fixed, particularly against rubbing, by merely drying the fibers after they have been impregnated with the dye and with a polyalkylene polyamide as referred to above. The polyalkylene polyamine should be present in an amount from about equal the dye to about one-tenth of the dye, calculated by weight. The drying temperature need not be higher than 100° C. to yield a dyed product extremely fast to rubbing. Lower drying temperatures down to about 90° C. can also be used but are not quite as effective. Drying temperatures higher than 100° C. can also be used and give sometimes better results with respect to the resulting fastness properties.

It is particularly noteworthy that the fastness obtained in accordance with the present invention is superior to the fastness obtained when hexamethylenetetramine is used in place of the alkylene polyamines.

The fastness of the dyeings pursuant to the present invention can be further improved, particularly against wet processing, by combining the polyalkylene polyamine treatment with the urea, thiourea, thioacetamide or dicyandiamide treatment of the above-identified application Ser. No. 747,478, now abandoned, the contents of which are hereby incorporated herein as though fully set forth. Some improvement is also obtained by merely adding any of these four fixing agents to the polyalkylene polyamine, or by heating the polyalkylene polyamine at temperatures above 100° C. and up to 225° C. in the presence of ammonium chloride or a similar salt of a fugitive amine with a stable acid.

Also as in said application Ser. No. 747,478, now abandoned, the fastness to wet processing can be even further improved by an aftertreatment with the bifunctional compounds of German Patents 952,619 and 1,221,607, Canadian patent specification 734,324, Belgian Patent 689,487 and U.S. Patent 3,326,629 granted June 20, 1967, optionally in the presence of alkalis.

Typical polyalkylene polyamines suitable for use in the present invention include polymerization products of cycloaliphatic imines, such as polyethylenimines and polypropylenimines, particularly those having K-values of between 15 and 60, as well as amino compounds such as diethylene triamine, pentaethylene hexamine, dipropylene triamine, tributylene tetramine.

The dyeing treatment of the present invention can be effected with dye liquors that are neutral, alkaline or acid. The polyalkylene polyamine tends to render the liquor alkaline with a pH as high as 10 but pH's as high as 12 can also be tolerated, additional alkali being then added. Acids, preferably volatile, can be added to bring the pH to as low as 3, or anywhere between 10 and 3.

The following examples are illustrative of the present invention and by no means limit the scope thereof. The percentages given are by weight and the temperatures in degrees centigrade.

EXAMPLE 1

A cotton fabric is impregnated with a dyebath containing 30 g./l. Hydrosol Yellow RR (Color Index No. 53121) and 20 g./l. of a 50% aqueous solution of polyethylenimine having a K-value of 18.2, then dried at 100°. A dyeing is obtained having good fastness to wet processing and rubbing.

By slop-padding the dyed product with 10 g./l. di-(chloroacetyl)-ethylene diamine (U.S. Pat. 3,326,629) in water and drying at 80°, the fastness to wet processing, particularly the fastness to peroxide washing, can be further improved.

EXAMPLE 2

A mixed fabric of cotton and spun rayon is impregnated with a dyebath containing 20 g./l. Hydrosol Yellow Brown GG (Color Index No. 53056) and 5 g./l. of a 50% aqueous solution of polyethylenimine having a K-value of 37.5, and dried at 100°. A dyeing is obtained having uniform color in both the cotton and the rayon as well as good fastness to wet processing and rubbing.

If the dyed product is impregnated with an aqueous solution of 20 g./l. of the reaction product of ethylene diamine and epichlorohydrin taught in Example 3, para 2 of Belgian Patent 689,487, and 10 g./l. calcined sodium carbonate, rinsed and dried at 70° after an air passage of 1 minute, the fastness to wet processing is also improved.

EXAMPLE 3

A cotton fabric is impregnated with a dyebath containing 60 g./l. Hydrosol Green GG (Color Index No. 53573), 20 g./l. of a 50% aqueous solution of polyethylenimine having a K-value of 42.1, and 50 g./l. urea, and dried at 100°. A dyeing is obtained having good fastness to wet processing and rubbing.

EXAMPLE 4

A cotton fabric is impregnated with a dyebath containing 30 g./l. Hydrosol Yellow-Brown GG (Color Index No. 53056), 20 g./l. ammonium chloride and 20 g./l. dipropylene triamine, then dried at 80° and subjected to a dry heat treatment for 1 minute at 200°. A dyeing is obtained having very good fastness to wet processing and rubbing.

Equally good results are obtained when the ammounium chloride is replaced by the same amount of ammonium sulfate ammonium oxalate, ammonium nitrate, ammonium dihydrophosphate, ammonium tartrate or ammonium citrate.

A similar result is obtained if the dipropylene triamine is replaced by the same amount of diethylene triamine, triethylene tetramine, tetraethylene pentamine or pentaethylene hexamine.

EXAMPLE 5

A mixed fabric of polyester and cotton is impregnated with a dyebath contining 50 g./l. Hydrosol Black B (Color Index No. 53186), 30 g./l. Resoline Yellow 5GS (Color Index No. 12790), 30 g./l. of a 50% aqueous solution of polyethylenimine having a K-value of 28.7, 25 g./l. urea and 25 g./l. dicyanodiamide, then dried at 85° and subjected to a dry heat treatment for one minute at 190–210°. The dyeing is finished by soaping. A bicolored dyeing is obtained having good fastness to wet processing and rubbing. If desired, the dyed product is aftertreated prior to soaping, with an aqueous solution of 20 g./l. of the above-mentioned reaction product of ethylene diamine with epichlorohydrin and 10 g./l. calcined sodium carbonate, and dried at 95° after air passage of one minute, in order to still further improve the fastness to wet processing.

EXAMPLE 6

A cotton fabric is impregnated with 20 g./l. of a 50% aqueous solution of polyethylenimine having a K-value of 58.9 and dried at 85°. The fabric so treated is then impregnated with a dyebath containing 70 g./l. Hydrosol Supra Green 3B (Color Index No. 53571) and 5 g./l. ammonium chloride, then dried at 85° and subjected to a dry heat treatment at 190–210° for one minute. A dyeing is obtained having good fastness to wet processing and rubbing.

A similar result is obtained by impregnating the fabric first with an aqueous solution of 70 g./l. Hydrosol Supra Green 3B and 5 g./l. ammonium chloride, then drying at 95°, impregnating the dried material with an aqueous solution of 20 g./l. of the same 50% aqueous polyethylenimine solution, then drying at 95° and subjecting the twice dried material to a dry heat treatment at 190–210° for one minute.

EXAMPLE 7

A cotton fabric is impregnated with a dyebath containing 60 g./l. Hydrosol Supra Yellow-Brown GL (Color Index No. 53326) and 20 g./l. of a 50% aqueous solution of the polyethylenimine of Example 1, dried at 80° and steamed for 1 minute at 105°. The dyeing is then soaped and dried. A dyeing having good fastness to wet processing and rubbing is obtained.

EXAMPLE 8

A cotton fabric is printed with a printing paste composed of

|  | G. |
|---|---|
| Hydrosol Black B (Color Index No. 53186) | 80 |
| Water | 380 |
| Urea | 100 |
| Dipropylene triamine | 40 |
| Alginate thickener of 4% strength | 400 |
|  | 1000 |

The printed fabric is dried and steamed at 105° for 8 minutes. The print is then finished by rinsing and soaping at the boil with 2 g./l. of p-octyl-phenoxyoctaethoxyethanol detergent.

A similarly fast product is obtained by either steaming the dried print at 150° for 1–3 minutes or subjecting it to a dry heat treatment at 150–220° for 1–3 minutes, instead of steaming the print at 105° for 8 minutes.

This example is particularly advantageous since it enables printing water-soluble sulfur dyes side by side with reactive dyes without halos.

EXAMPLE 9

A cotton fabric is impregnated with a dye liquor containing 30 g./l. Hydrosol Yellow RR (Color Index No. 53121), 15 g./l. of a 50% aqueous solution of the polyethylenimine of Example 3, and 2 cc./l. sodium hydroxide solution of 38° Bé., then batched and after 6 hours time dried and treated at 120° for one minute. Subsequently the dyeing is again rinsed, acidified and dried at 60° to give a product fast to processing and rubbing.

Obviously many modifications and variations of the present invention are possible in the light of the above teachings. It is, therefore, to be understood that within the scope of the appended claims the invention may be practiced otherwise than as specifically described.

What is claimed:

1. In the process of dyeing cellulosic fibers with a thiosulfonate of a sulfur dye and without the use of a dye-reducing operation, the improvement wherein the fibers are dried at a temperature at least as high as 90° C. while in contact with the dye and also with a polyalkylene polyamine having at least three primary or secondary amine groups and in which the alkylene groups have two to four carbons.

2. The process of claim 1 in which the polyamine is a polyethylenimine, a polypropylenimine, or a mixture thereof having a K-value of about 15–60 and is present in a proportion from about equal to about one-tenth that of the dye, by weight, and the drying temperature is not higher than about 100° C.

3. The process of claim 1 which the polyamine is diethylene triamine, triethylene tetramine, tetraethylene pentamine, pentaethylene hexamine, dipropylene triamine or a mixture thereof in a proportion from about equal to about one-tenth that of the dye by weight, and the drying temperature is not higher than about 100° C.

4. The process of claim 1 in which the drying is carried out while the dye is also in contact with a least one of urea, thiourea, thioacetamide and dicyandiamide.

5. The process of claim 4 in which the drying is at a temperature higher than 100° C.

6. A dyeing composition having a thiosulfonate of a sulfur dye and in a proportion by weight from about equal to about one-tenth of the dye, a polyalkylene polyamine having at least three primary or secondary amine groups and in which the alkylene groups have two to four carbons.

7. The composition of claim 6 in which there is also present urea, thiourea, thioacetamide or dicyandiamide in an amount at least equal to the dye by weight.

8. The composition of claim 6 in which the polyalkylene polyamine is a polyethylenimine, a polypropylenimine or a mixture thereof having a K-value of about 15–16.

9. The composition of claim 6 in which the polyalkylene polyamine is diethylene triamine, triethylene tetramine, tetraethylene pentamine, pentaethylene hexamine, dipropylene triamine or a mixture thereof.

References Cited

UNITED STATES PATENTS 3,387,913    6/1968    Tigler et al. _____ 8—37

FOREIGN PATENTS 734,324    5/1966    Canada.
952,619    11/1956    Germany.

GEORGE F. LESMES, Primary Examiner

P. C. IVES, Assistant Examiner

U.S. Cl. X.R.

8—74, 84, 1.213

PO-1050
(5/69)

UNITED STATES PATENT OFFICE
CERTIFICATE OF CORRECTION

Patent No. 3,579,286      Dated May 18, 1971

Inventor(s) Christian Heid, Willi Gunzert and Fritz Engelhardt

It is certified that error appears in the above-identified patent and that said Letters Patent are hereby corrected as shown below:

Col. 1, line 21, "polyamide" should read -- polyamine --;

line 43, "polyamide" should read -- polyamine --.

Col. 2, line 70, "sulfate ammonium" should read -- sulfate, ammonium --.

Signed and sealed this 16th day of November 1971.

(SEAL)
Attest:

EDWARD M. FLETCHER, JR.      ROBERT GOTTSCHALK
Attesting Officer      Acting Commissioner of Patents